June 15, 1943.  R. TONDEUR  2,321,780
REMOTE CONTROL OF PARTS ACTUATED THROUGH
FLEXIBLE POWER TRANSMISSION MECHANISM
Filed Sept. 10, 1940
3 Sheets-Sheet 1
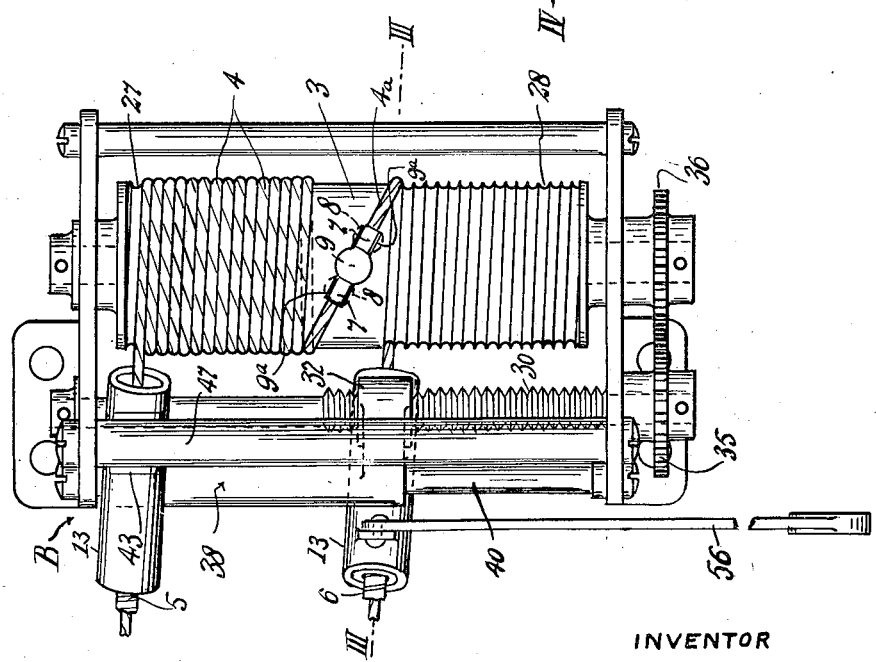
INVENTOR
RENE TONDEUR
BY
Albert F. Nathan
ATTORNEY

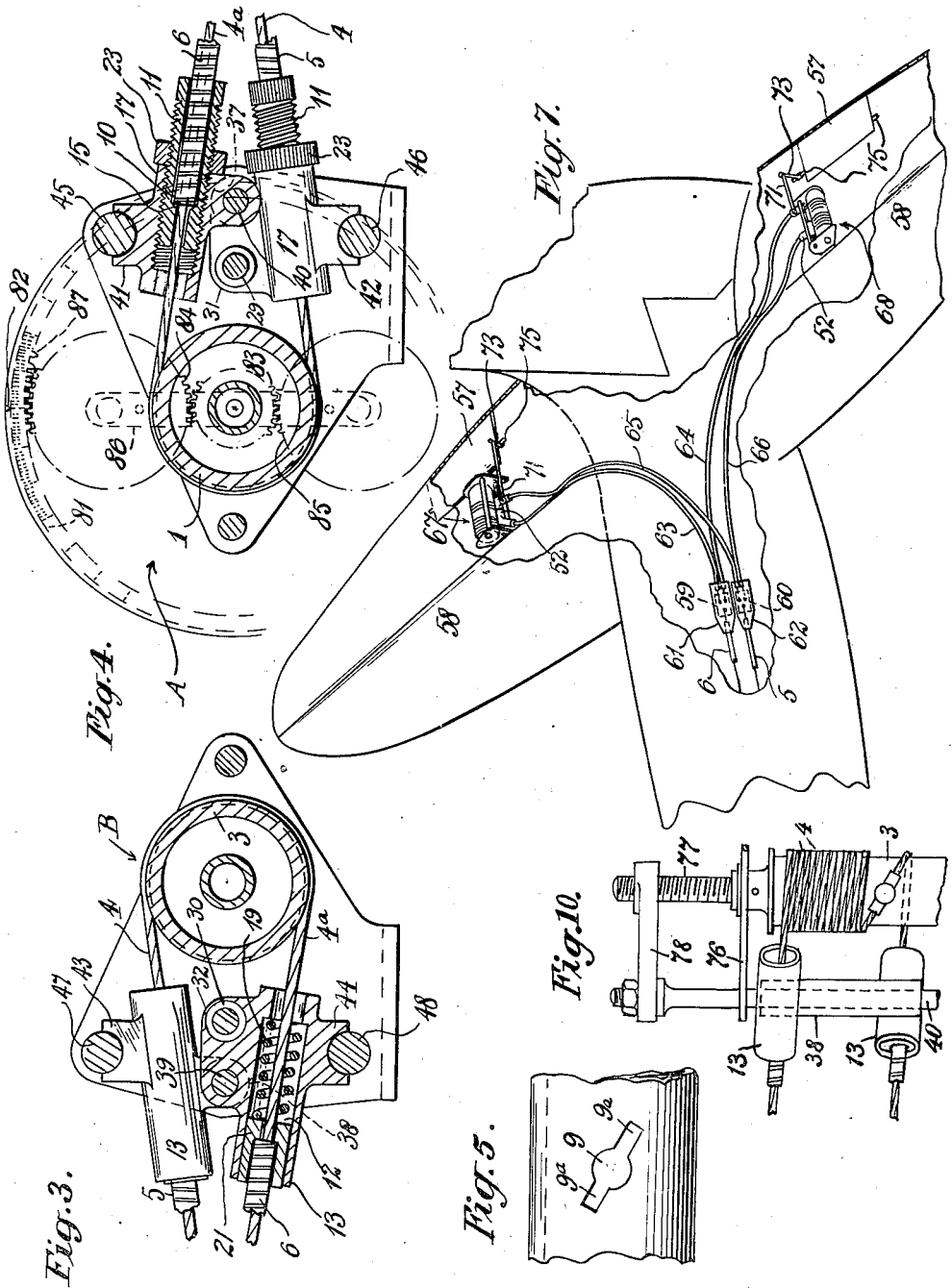

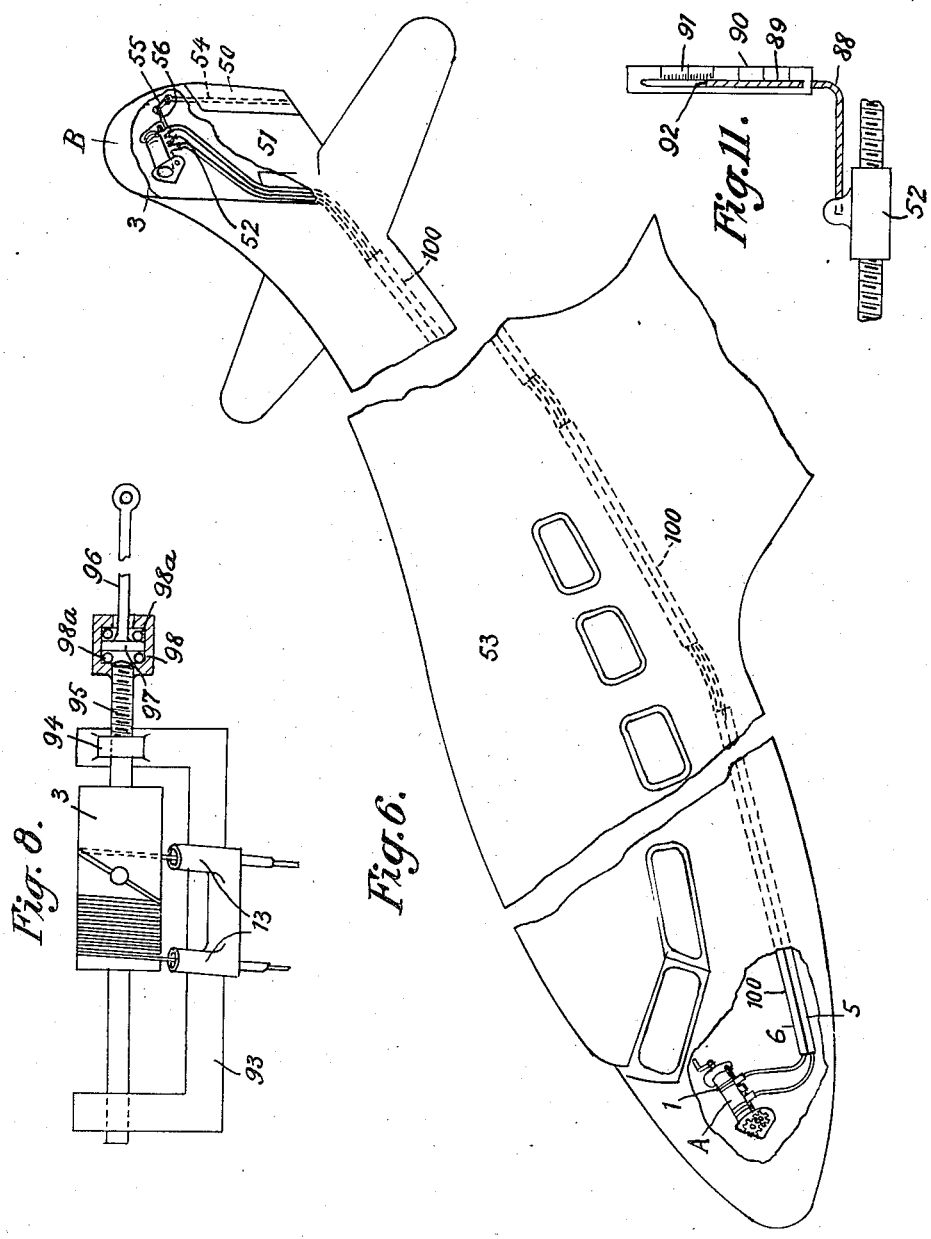

Patented June 15, 1943

2,321,780

UNITED STATES PATENT OFFICE 2,321,780

REMOTE CONTROL OF PARTS ACTUATED THROUGH FLEXIBLE POWER TRANSMISSION MECHANISMS

Rene Tondeur, Lechdale, England, assignor to Bowden (Engineers) Limited, Willesden Junction, London, England, a British company Application September 10, 1940, Serial No. 356,162
In Great Britain July 10, 1940

12 Claims. (Cl. 74—501)

The present invention relates to the remote control of parts through Bowden transmission mechanism and it aims at providing a readily constructed, light weight, and smoothly operating mechanism for transmitting rotary motion from one station to another, the invention being well suited for the transmission of power through considerable distances in other than a straight line.

It has been proposed to use two Bowden mechanisms the cables of which wrap around one axially fast drum at one station and another at the distant station in such a manner that when one drum is given a part turn in either direction one cable wraps up and the other unwraps on each drum, the outer Bowden members being brought up to fixed abutments near the drums. With such an arrangement the amount of rotation that can be transmitted from drum to drum must be unduly restricted since repeated flexing about the abutments of the short length of cable between it and the drum which would take place if several convolutions were formed along the drums would give rise to liability of fraying or rupturing of the cables and would interfere with an easy coiling or uncoiling of the cables along the drums. To obviate this difficulty we make the drums and the abutments relatively axially displaceable so as to keep the abutments substantially in line with the portions of the cables between the abutments and the drums while the several convolutions are coiling or uncoiling along the drums.

According to the present invention therefore the winding drums are rotatable one by the other in either direction by the longitudinal displacement of the inner members or cables of Bowden mechanisms in such a manner that when one drum is rotated in either direction one cable coils and another uncoils along each drum, the drums and the abutments for the outer members of the Bowden mechanism being relatively axially displaceable while the several convolutions of the cable are coiling or uncoiling along the drums so as to keep the abutments substantially aligned with the portions of the cables between the abutments and the drums.

Thus each drum may be given many turns and the Bowden outer members, which may each be in one continuous length between the drums or may be divided into end sections joined by a rigid tubular section or by more than one rigid section with an intervening length or lengths of Bowden outer tubing, can thus be brought up to abutments near to the drums without the risk of the cables fraying or rupturing.

When a certain load is encountered at the remote end there is a tendency for the compression of one of the outer Bowden members to be lessened and for the corresponding cable unwinding from the near drum to slacken and leave the drum. In order to obviate or reduce this tendency we preferably arrange a spring between one abutment and the corresponding end of the outer member of each Bowden mechanism, which spring tends to maintain the outer member under compression when it tends to relax. Provision may be made for regulating the longitudinal displacement of the outer member which places the spring in the desired state of compression. For example, the abutments at one station may be in the interior of hollow screws arranged to work in fixed threaded sockets, the screws being movable to apply more or less axial pressure on the outer members of the Bowden mechanisms and thus regulate the compression of the spring at the other station. The spring may be housed in a cylindrical recess and a plunger on the outer Bowden member may work in such recess, the plunger having a smaller bore in its end wall to permit the passage of the cable.

The relative axial movements required between the drum and the abutments for the foregoing purpose may be readily achieved by a screw and nut mechanism operated by the drum and this movement may be turned to further advantage since by using such movement, which is very small in relation to the considerable longitudinal displacement of each cable, to initiate the operation of the part to be actuated a high mechanical advantage and delicacy of control over such part can be obtained.

The drum may move axially, e. g., it may have a screw at one end traversing a fixed nut, or the drum may carry or be geared to, a screw which displaces a nut which is a part of or is connected to the abutments. The same form of mechanism may be employed at each end of the device or one form may be used at one end and another at the other end. The device may be reversible in that it may be operated from either end.

The two abutments at each end may be integral with or fixed to each other, e. g., forming with a nut a one-piece structure so that the straight cable lengths entering and leaving the drum will keep in parallel planes.

Where the abutments are movable, a sufficient end length of each Bowden mechanism is left free to ensure that sharp changes in curvature of the cable will be avoided between the abutment and the rigid tube or other point of anchorage of the outer Bowden members.

The invention is well suited, for example, for controlling from the pilot's cabin the trimming tabs or flaps of the rudder, elevators or ailerons of aircraft, i. e., the flaps which are movable with reference to these control surfaces. A light cable and conduit can be used, the load transmitted being light and the effect being obtained by moving the cable through a considerable distance to transmit the power required. Backlash and springiness in operation, characteristic of cable controls due to high loading of the cables in relation to their breaking strain, are reduced. The spring abutments conduce to further reducing backlash and to maintaining such friction between the inner and outer Bowden members on the bends as will dampen vibration.

Suitable indicating means may be incorporated at the control end for exhibiting the extent of operation of the tab or other part. For example an epicyclic gear train may be mounted about the axis of the control drum or the longitudinal displacement of a flexible member by the screw-nut mechanism may give the indication required.

The cables may wind along plain cylindrical surfaces of the drums with the convolutions contacting or forming an open coil but it is preferred to provide the periphery of the drum with helical grooves and to make the grooves deep enough to take the whole section of the cable. The pitch of the threads of the screw spindle will be made equal to that of the helical grooves.

In order that the invention may be the more readily understood reference is hereinafter made to the accompanying drawings, in which—

Fig. 1 is a plan view showing the winding apparatus at the remote station and Fig. 2 a plan view showing that at the control station. Fig. 3 is a sectional side view on the line III—III of Fig. 1 and Fig. 4 a sectional side view on line IV—IV of Fig. 2. Fig. 5 is a part plan view of one of the drums showing the slot which receives the nipples of the cables. Fig. 6 is a view of an aircraft showing the control apparatus fitted in operative connection to the trimming tab of the rudder of the aircraft, the drawing being diagrammatic and not to scale so as to show clearly the control mechanism. Fig. 7 is a part view of an aircraft showing diagrammatically how the remote station control mechanism may be operatively connected to the trimming tabs of the elevator. Fig. 8 is a view of the remote winding device modified to provide for the drum to move axially instead of the guide members. Fig. 9 is a detail view of one of the drums showing an alternative and preferred form of the grooves. Fig. 10 shows an alternative mounting of the screw and nut at the remote end. Fig. 11 is a detail view of an alternative form of indicator.

Referring to the drawings, the part of the apparatus which is arranged at the control station is generally indicated as A and that at the remote station by B.

At each station a winding drum is provided, the drum 1 at the control station having pinned to its shaft or otherwise made fast with it a crank handle 2 by which the drum may be conveniently rotated.

Motion is transmitted from the drum 1 to the drum 3 at the remote station through the medium of cables which constitute the inner members 4, 4a of two Bowden mechanisms whose outer members are indicated as 5 and 6. The inner members are anchored at each end to the drums. For this purpose the ends of each inner member are provided with a nipple 7 having an enlargement 8 to pass through a central hole 9 in the wall of each drum, each hole having narrow side notches 9a to receive the smaller parts of the nipples after the enlargements have been passed through the central hole. The outer members 5, 6 of the Bowden mechanism take their abutment in recesses 10 in the screw member 11 at the control station and take their abutment in recesses 12 in guide members 13 for the cables at the remote station. The screws 11 at the control station are received in screw threaded sockets 15 in abutment members 17 which also serve as guides for the cables at that station. The abutments 13 at the remote station each houses a spring 19 which can be compressed by adjusting the corresponding screw at the control station. This adjustment axially displaces the outer member and a plunger 21 secured to the remote end of each outer member compresses the spring to the degree controlled by the adjustment of the screws. The screws may be locked in the adjusted position by lock nuts 23. The ends of the outer Bowden members may be flared outwardly such as by spreading the coils forming said members so that any slight lack of coaxiality between such ends and the portion of the cable entering or leaving them is less likely to cause injury to the cable. The bore of the plungers 21 and the small bores in the screw adaptors 11 may also be flared. The mouths of the abutment members may also be flared.

In winding the cable onto the drums it is necessary that the cables should coil along the drums and it is advantageous, although not essential, to provide the drums with helical grooves 25, 26, 27 and 28, and in order that the guide members 13 and 17 for the cables shall adjust themselves to the coiling of the cables along the drums such members are arranged to be movable parallel to the axes of the drums simultaneously with the winding operation. It is a feature of the invention to provide for a positive transmission of drive through the cables from the drum 1 to the drum 3 in whichever direction the drum 1 is rotated and for this purpose the cables are so connected that as the cable of one Bowden mechanism is being wound up on the control drum the cable of the other Bowden mechanism is being unwound from such drum while simultaneously the cable which is being wound on the control drum is driving the remote drum and is being unwound therefrom and the other cable, by such rotation of the remote drum, is being wound up on the latter.

In winding, the cables produce coils of fine pitch either with the convolutions touching or in slightly spaced relationship (the pitch may be determined by the form of the helical grooves). Side thrust by the abutments on the cables which if allowed would tend to produce fraying of the cables and to interfere with the smooth working of the winding system is avoided since as the cables wrap around or unwrap from the drums the relative movement between the abutment members and the drums parallel to the axes of the drums is such that there is no sudden change of direction of the cable near where it enters in contact with or leaves the drum. In the form illustrated, the drum is fixed axially and the abutment members 13 and 17 travel.

This movement is effected by mounting parallel to the axes of the drums screw spindles 29 and 30 with which a nut 31 or 32 co-operates and in this preferred form of the invention a single nut is used at each end, the nut and the two abutment members at the corresponding station, being a one piece structure, the nut being an integral extension of one of the abutment members which are joined by a sleeve 37, 38. The pitch of the screw and the nut is such as to make the transmission irreversible and therefore the trimming tab remains set in any adjusted position. This is important for there is a liability for the tab to move out of the adjusted position under the various loads during the various speeds of the aircraft. Each screw spindle is geared to the drum by spur gearing 33, 34 and 35, 36 respectively, and each one piece nut and abutment structure is held against rotation but given freedom to move axially by arranging the sleeve portion 37 or 38 of each structure to slide along a fixed rod 39, 40 and providing each structure with channel portions 41, 42 and 43, 44 respectively, to co-operate with upper and lower fixed guide rods 45, 46, 47 and 48.

The pitch of each screw spindle is so chosen in relation to the diameter of the cables and the spacing if any of their convolutions as to be equal to the pitch of the coils formed by the cables so that as the drums themselves rotate and operate the screw spindles through the said gearing, the abutment members travel along the screw spindles and as the cables are respectively coiling along the drums or un-wrapping therefrom so the abutment members travel parallel to the axes of the drums and those stretches of the cables which are passing on to or off of the drum are prevented from making any undesired angling or sudden changes of direction. The abutments are arranged at a slight angle to the perpendicular to the axes of the drums so as to be truly aligned with the direction in which the cable leaves or enters contact with the drum.

It will be observed that the longitudinal displacement of the cables in the course of wrapping on and off the drums will be exceedingly great in relation to the movement of the abutment members parallel to the axes of the drums and in accordance with the invention the remote abutment members are preferably operatively coupled to a part to be actuated, which is shown in Fig. 6 as the trimming tab 50 of a rudder 51 of an aircraft 53 so that a very large movement at the control end is translated into a small movement of the remote end and considerable mechanical advantage and delicacy of control is thereby made available. Moreover, the mechanical advantage can be multiplied still further by providing the drum 1 as shown with a crank handle suitably longer than the radius of the drum or otherwise introducing power multiplying leverages or the like between the handle knob and the control drum. The motion is transmitted to the tab 50, by mounting this as usual to hinge about an axle 54 which carries an arm 55 which is pivoted to a link 56 which is in turn pivoted to the one piece structure 52 formed by the guide members 13, nut 32 and sleeve 38. The whole control may be enclosed, the remote drum device being arranged within the hollow rudder, and the Bowden mechanism passing up the hollow rudder post on its way to the drum.

The amount by which the tab is adjusted on either side of the zero position, where it lies in the plane of the main rudder, can be indicated by a rotatable dial 81 co-operating with a fixed mark or pointer 82 and operated through a suitable gear train from the crank handle 2. An epicyclic gear train which serves well for this purpose comprises a driving pinion 83 carried by the handle shaft and gearing with two spur wheels 84, 85 carried by a rotatable arm or bar 86 and meshing with a fixed internal gear 87 which may have the aforesaid mark 82 impressed at a suitable part thereon. The dial 81 is attached to the arm or bar 86. The gear is shown diagrammatically but by way of example, a ratio of gearing which will serve is one in which the handle 2 makes 20 revolutions to one revolution of the dial.

In the alternative form of indicator shown in Fig. 11 the nut, or the one piece structure 52 incorporating the nut, at the control station has attached to it one end of a length of incompressible flexible tubing 88 which moves along a bore 89 in a tube 90 which is provided with a suitable scale 91.

As the nut advances in one direction or the other so the outer end 92 of the tube 88 travels up or down the bore in the tube which is longitudinally slotted adjacent the scale to expose such end. A piece of outer tubing of a Bowden mechanism serves well as the member 88.

In Fig. 7 the remote end of the apparatus is shown operatively connected to the trimming tabs 57 of the elevators 58 of an aircraft, the inner cables of the Bowden mechanisms 5, 6 from a common control drum being attached to the slide blocks 59, 60 in junction boxes 61, 62 which provide abutments for the outer members of such Bowden mechanisms, and to each slide block the inner members of two Bowden mechanisms 63, 64 and 65, 66 respectively are connected. The Bowden mechanisms 63 and 65 pass to a remote drum device 67 and the Bowden mechanism 64 and 66 pass to another drum device 68 both of these drum devices being constructed in the manner shown at the station B, Figs. 1 and 3. To each one piece structure 52 consisting of the nut and the abutment members, a link 71 is pivoted. The other end of each link is pivoted to an arm 73, on the axle 75 of the elevator tab. Therefore, when the control drum is operated in one direction the one piece structures 52 are operated to turn the tabs 57 simultaneously in the same direction whereas the reverse rotation of the control drum causes the displacement of the one piece structures 52 in the reverse direction which through the links 71 and arms 73 causes the tabs to swing in the reverse direction. The control is enclosed, the two remote drums being shown mounted in the hollow elevator planes with the Bowden mechanisms passing along the hollow shaft of the elevator on its way to the drum.

Although we have described a form in which the abutment members travel with respect to the drum the reverse movement could be relied on. Moreover, in lieu of the arrangement of the screw spindle at the remote end parallel to the remote drum the latter may have a screw threaded spindle arranged as an axial extension 77 of the drum (see Fig. 10) so that during its rotation relatively to the fixed frame 76 it imparts axial movement to a nut which may be a part of an arm 78 integral with the abutment members.

In Fig. 8 the abutment members 13 are fixed to the stationary framework 93 carrying a fixed nut 94 through which traverses the screw spindle 95 which is an axial extension of the drum 3 so that as the latter is rotated through the medium of the cables it is also given an axial movement.

The spindle can be loosely coupled to a link 96 which is similar to the link 56 hereinbefore referred to and actuates the arm on the axle of the trimming tab. The link may have an end collar 97 freely rotatable in a hollow box-like fitting 98 fast with the end of the spindle 95, the box fitting preferably having end thrust ball bearings 98a to facilitate the rotation of the screw spindle relatively to the link 96 which should not rotate.

The outer members of the Bowden mechanism may extend from the abutment at the control station to the abutment at the remote station or intermediate bared lengths of the cable may pass over guide pulleys but it is not generally preferred that this should be so, especially in the application of the device to the control of aircraft tabs or flaps. It is then desirable to preserve as straight a run as possible between the two stations and in this case the cable may pass through one or more fixed rigid tubes 100 (see Fig. 6) arranged to provide at each end an abutment against which the outer end of a short length of Bowden outer member takes its seating. This arrangement reduces frictional losses and the liability of any movement occurring of the control due to flexure of the skeleton structure of the aircraft is largely prevented.

The springs 19 provide resilient abutments for the remote end of each outer Bowden member and the springs will be initially adjusted to a degree of compression at least equal to the maximum load which the apparatus is designed to transmit. When heavy load is applied to the remote drum that end of the outer member of the Bowden mechanism of which the cable is being wound up on the remote drum is moved outwards by the force of the compressed spring abutment while the corresponding end of the outer Bowden member associated with the cable which is unwrapping from such drum moves inwards and further compresses the spring abutment. Tendency for the cable being unwound from the control drum to slacken and jump off the drum is thus countered. If desired this tendency for the cable to move off the end of the drum may be further countered by flanging the ends of the drums.

The detail view, Fig. 9 shows how the helical grooves 25, etc., may be of sufficient depth completely to accommodate the cable so that there is no projection of the latter from the groove.

It is desirable to use a cable of many strands; a stainless steel cable of 28 strands has been found to work well.

What I claim is:

1. A distant control device comprising a pair of winding drums and Bowden mechanisms, abutments near said drums for the outer members of said Bowden mechanisms, the inner cables of said mechanisms being operatively mounted on the drums so that one is adapted to make and the other to unmake several convolutions along each drum in whichever direction one drum is rotated, so as thereby to transmit considerable rotary motion to the other drum, means operative through the rotation of said drums for relatively displacing said drums and said abutments in the direction of the axis of the respective drum while the several convolutions of the cable are coiling or uncoiling along the drums so as to keep the abutments substantially aligned with the portions of the cables between the abutments and the drums.

2. A distant control device comprising a pair of winding drums and Bowden mechanisms, abutments near said drums for the outer members of said Bowden mechanisms, at least one end of each Bowden mechanism being spaced from the wall of the corresponding abutment by spring means adapted to keep said outer members in compression, the inner cables of said mechanisms being operatively mounted on the drums so that one is adapted to make and the other to unmake several convolutions along each drum in whichever direction one drum is rotated so as thereby to transmit considerable rotary motion to the other drum, means operative through the rotation of said drums for relatively displacing said drums and said abutments in the direction of the axis of the respective drum while the several convolutions of the cable are coiling or uncoiling along the drums so as to keep the abutments substantially aligned with the portions of the cables between the abutments and the drums.

3. A distant control device comprising a pair of winding drums and Bowden mechanisms, abutments near said drums for the outer members of said Bowden mechanisms, at least one end of each Bowden mechanism being spaced from the wall of the corresponding abutment by spring means adapted to keep said outer members in compression, screw means operative from the remote end of each Bowden mechanism for adjusting said spring means to regulate the compressive force they exert on said outer members, the inner cables of said mechanisms being operatively mounted on the drums so that one is adapted to make and the other to unmake several convolutions along each drum in whichever direction one drum is rotated so as thereby to transmit considerable rotary motion to the other drum, means operative through the rotation of said drums for relatively displacing said drums and said abutments in the direction of the axis of the respective drum while the several convolutions of the cable are coiling or uncoiling along the drums so as to keep the abutments substantially aligned with the portions of the cables between the abutments and the drums.

4. A distant control device comprising a pair of winding drum members and Bowden mechanisms, abutment members near said drum members for the outer components of said Bowden mechanisms, the inner cables of said mechanisms being operatively mounted on the drum members so that one is adapted to make and the other to unmake several convolutions along each drum member in whichever direction one drum member is rotated so as thereby to transmit considerable rotary motion to the other drum member, means operative through the rotation of said drum members for relatively axially displacing said drum members and said abutment members in the direction of the axis of the respective drum member while the several convolutions of the cable are coiling or uncoiling along the drum members so as to keep the abutment members substantially aligned with the portions of the cables between the abutment members and the drum members and co-operating connecting means between a moving one of said relatively axially displaceable members and a part such as a trimming tab to be actuated by the rotation of one of said drums so that motion is transmitted to said part through said relative axial displacement.

5. A control as in claim 1, in which the outer components of the Bowden mechanism are each medially interrupted at least once and the ends so formed are held up to abutments formed by at least one rigid tube through which the cable passes.

6. A distant control device comprising a control winding drum and a remote winding drum, at least said remote drum being axially immovable, and Bowden mechanisms, abutments near said drums for the outer members of said Bowden mechanisms, the inner cables of said mechanisms being operatively mounted on the drums so that one is adapted to make and the other to unmake several convolutions along each drum in whichever direction one drum is rotated so as thereby to transmit considerable rotary motion to the other drum, means operative through the rotation of said drums for displacing said abutments which are associated with the axially immovable drum in the direction of the axis of the drum at substantially the rate at which the several convolutions of each cable are coiling or uncoiling along the drum so as to keep the abutments substantially aligned with the portions of the cables between the moving abutments and the corresponding drum and means operatively connected to said movable abutments and a part such as a trimming tab to be actuated by the rotation of the drums.

7. A distant control device according to claim 6, in which said axially immovable drum is provided with a screw and the adjacent pair of abutments are on a nut which is displaceable along said screw by rotation of the drum in order to traverse said abutments.

8. A distant control according to claim 6, in which said means which are operative through the rotation of the drums for axially displacing the abutments comprise screw means, gearing between the said axially immovable drum and said screw means and a pair of adjacent abutments on a nut which is displaceable along said screw when the latter is rotated by the drum through the gearing in order to traverse said abutments.

9. A distant control device comprising a pair of winding drums, at least one of which is axially displaceable, and Bowden mechanisms, abutments near said drums for the outer members of said Bowden mechanisms, at least those abutments associated with an axially displaceable drum being fixed, the inner cables of said mechanisms being operatively mounted on the drums so that one is adapted to make and the other to unmake several convolutions along each drum in whichever direction one drum is rotated so as thereby to transmit considerable rotary motion to the other drum, means functioning through the rotation of said drums for giving said axially displaceable drum its axial movement while the drum is rotating at substantially the rate at which the several convolutions of each cable are coiling or uncoiling along the drum so as to keep the abutments substantially aligned with the portions of the cable between the abutments and the drums and means operatively connected to said axially movable drum and a part such as a trimming tab to be actuated by the rotation of said drum.

10. A distant control device comprising a control winding drum member and a remote winding drum member and a pair of Bowden mechanisms, abutment members near said drum members for the outer components of said Bowden mechanisms, the inner cables of said mechanisms being operatively mounted on the drum members so that one is adapted to make and the other to unmake several convolutions along each drum member in whichever direction the control drum member is rotated so as thereby to transmit considerable rotary motion to the remote drum member, means operative through the rotation of said drum members for producing relative displacement between said drum members and said abutment members in the direction of the axis of the respective drum member while the several convolutions of the cable are coiling or uncoiling along the drum members so as to keep the abutment members substantially aligned with the portions of the cables between the abutment members and the drum members, co-operative connecting means at the remote drum end between a moving one of said relatively axially displaceable members and a part such as a trimming tab to be actuated by the rotation of one of said drum members so that motion is transmitted to said part through the relative axial displacement between said drum and abutment members and indicating means associated with the control drum member for indicating the extent of operation of the part at the remote end.

11. A distant control as in claim 10, in which said indicating means comprises an epicyclic gear train mounted about the axis of the control drum.

12. A distant control as in claim 10, comprising screw-nut mechanism operated by the control drum and a flexible indicator member which is longitudinally displaced thereby.

RENE TONDEUR.